(12) United States Patent
Barber (10) Patent No.: US 11,359,608 B2
(45) Date of Patent: *Jun. 14, 2022

(54) SEGMENTED AIRFOIL DESIGN FOR GUIDE WIRES

(71) Applicant: Gerald L. Barber, Greenville, SC (US)

(72) Inventor: Gerald L. Barber, Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/165,616

(22) Filed: Feb. 2, 2021

(65) Prior Publication Data

US 2021/0156359 A1    May 27, 2021

Related U.S. Application Data

(63) Continuation of application No. 16/987,045, filed on Aug. 6, 2020, which is a continuation of application
(Continued)

(51) Int. Cl.
| | |
|---|---|
| *F03D 13/20* | (2016.01) |
| *F03D 1/06* | (2006.01) |
| *F03D 80/80* | (2016.01) |
| *F03D 9/32* | (2016.01) |
| *F03D 13/25* | (2016.01) |

(52) U.S. Cl.
CPC ........... *F03D 13/20* (2016.05); *F03D 1/0625* (2013.01); *F03D 9/32* (2016.05); *F03D 13/25* (2016.05); *F03D 80/80* (2016.05); *F05B 2220/706* (2013.01); *F05B 2230/6102* (2013.01); *F05B 2240/12* (2013.01); *F05B 2240/912* (2013.01); *F05B 2240/9152* (2013.01); *F05B 2240/93* (2013.01); *F05B 2240/95* (2013.01); *F05B 2260/02* (2013.01)

(58) Field of Classification Search
CPC ............ F05B 2240/33; F05B 2240/302; F05B 2260/78
See application file for complete search history.

(56) References Cited

U.S. PATENT DOCUMENTS

| | | |
|---|---|---|
| 4,105,363 A | 8/1978 | Loth |
| 4,111,601 A | 9/1978 | Richard |

(Continued)

FOREIGN PATENT DOCUMENTS

| | | |
|---|---|---|
| WO | 2012040320 A2 | 3/2012 |
| WO | 2012040320 A3 | 3/2012 |
| WO | 2014006542 A2 | 1/2014 |

OTHER PUBLICATIONS

Extended European search report for PCT/US2018031832.
International Search Report for PCT/US2018031832.

*Primary Examiner* — Igor Kershteyn
*Assistant Examiner* — Jason Fountain
(74) *Attorney, Agent, or Firm* — Kim and Lahey Law Firm, LLC; Douglas W. Kim; Seann P. Lahey (57) ABSTRACT

The present invention is an improved wind turbine comprising: a wind turbine wheel having a hub, a rim and a cable extending between the hub and the rim; a set of airfoils rotatably carried by the cable and disposed between the hub and the rim; a cinch attached to the cable and disposed between adjacent airfoils; and, an upturned section included in at least one airfoil in the set of airfoils and disposed at a trailing edge of the airfoil wherein each airfoil has a different angle of attack relative to an adjacent airfoil.

20 Claims, 9 Drawing Sheets

Related U.S. Application Data

No. 16/059,126, filed on Aug. 9, 2018, now Pat. No. 10,788,016, which is a continuation-in-part of application No. 15/975,004, filed on May 9, 2018, now Pat. No. 10,941,751.

(60) Provisional application No. 62/543,206, filed on Aug. 9, 2017, provisional application No. 62/504,041, filed on May 10, 2017.

(56) References Cited

U.S. PATENT DOCUMENTS

| | | |
|---|---|---|
| 4,213,737 A | 7/1980 | Gerhardt |
| 4,330,714 A | 5/1982 | Smith |
| 4,537,146 A * | 8/1985 | Wainwright .......... B63H 9/061 |
| | | 114/102.16 |
| 6,782,667 B2 | 8/2004 | Henderson |
| 6,955,025 B2 | 10/2005 | Dehlsen |
| 7,112,010 B1 | 9/2006 | Geiger |
| 9,816,384 B2 * | 11/2017 | Birkestrand .......... F03D 1/0675 |
| 10,458,391 B2 | 10/2019 | Zhang |
| 2010/0266407 A1 | 10/2010 | Barber |
| 2010/0266412 A1 | 10/2010 | Barber |
| 2011/0020123 A1 | 1/2011 | Anderson |
| 2011/0068729 A1 | 3/2011 | Barber |
| 2012/0134823 A1 | 5/2012 | Tully |
| 2012/0163981 A1 | 6/2012 | Hong |
| 2014/0140846 A1 * | 5/2014 | Birkestrand .......... F03D 1/0675 |
| | | 416/10 |
| 2014/0322013 A1 | 10/2014 | Elkin |
| 2016/0305147 A1 | 10/2016 | Homsi |
| 2017/0030331 A1 | 2/2017 | Zhang |

* cited by examiner

SEGMENTED AIRFOIL DESIGN FOR GUIDE WIRES

RELATED APPLICATIONS

This application is a continuation of U.S. patent application Ser. No. 16/987,045 filed Aug. 6, 2020. U.S. patent application Ser. No. 16/987,045 is a continuation in part of U.S. patent application Ser. No. 16/059,126 (now U.S. Pat. No. 10,788,016 issued Sep. 29, 2020). U.S. patent application Ser. No. 16/059,126 claims priority on U.S. Provisional Patent Application 62/543,206 filed Aug. 9, 2017 and U.S. patent application Ser. No. 15/975,004 filed May 9, 2018. U.S. patent application Ser. No. 15/975,004 claims priority on U.S. Provisional Patent Application 62/504,041 filed May 10, 2017. Each of these patent applications and patent are incorporated by reference.

BACKGROUND OF THE INVENTION

1) Field of the Invention

The present invention relates to an improved segmented self-positioning wind turbine assembly having self-positioning airfoils for generating electricity in response to the movement of atmospheric wind.

2) Description of Related Art

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes. For example, wind turbines in the form of propellers mounted on towers have been placed in areas where steady winds are prevalent, and the wind turbines are used to generate electricity. An electrical generator is usually positioned near the axis of rotation of the propellers, adding the weight of the generator to the upper portion of the mast of the assembly. The blades of the conventional large wind turbines are large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades usually move at a very high velocity and are engaged by strong winds, the larger the blades the stronger they must be and the more expensive they become. Thus, there is a practical limit as to the length and width of the blades.

Another wind turbine type has rigid propellers that appear to be rigidly mounted to circular perimeter rims that support the outer ends of the propellers, as shown in U.S. Pat. Nos. 1,233,232 and 6,064,123. Rubber tires or other rotary objects are placed in positions to engage the outer rim so as to rotate the rubber tires, with the driven tires rotating the rotor of a generator. Thus, the rotation of the wind turbine is used to generate electricity. A disadvantage of the rigid propeller design is its ability to handle the fact that the closer to the tip or perimeter of the blade you get, the faster the blade is moving through the air and so the greater the apparent wind angle is. Thus, the blade needs to be turned further at the tips than at the hub so that there is a twist along its length. The blade's optimal angle of attack can be determined by apparent wind direction. The apparent wind direction changes as the speed of the blade increases, even when a uniform wind velocity exists across the wind turbine swept area. Blades with a twist are more expensive to make. Traditional wind turbine blades themselves are also very expensive to maintain and replace.

One of the advantages of a turbine wheel with a perimeter rim is that the electrical generator(s) may be positioned at the rim at the lower arc of rotation of the rim where the generators are closer to the ground or other low supporting surface to remove the weight of the generator from the upper portion of the mast. Also, the position of the generator at a rim of the turbine wheel gives more access for installation, maintenance, repair and replacement of the generator. However, if the perimeter rim of the wind turbine wobbles during operation, it may be difficult to maintain the generator in proper alignment with the rim and it appears likely that stress between the generator and the turbine wheel will occur. Also, if multiple ones of the generators are placed in operative locations about an arc of the rim of the turbine, the potential problems caused by the wobbling rim appear likely to be more prevalent.

Further, it is advantageous for the rim to be as circular as possible so to reduce vibrations and to maintain consistent contact with the generator. To assist with maintaining a circular rim, guide wires can be included to extend from the perimeter of the rim to the hub to support the rim. However, the guide wires can create drag and reduce the output of the wind turbine. It would be advantageous to reduce this drag caused by the guide wires.

Accordingly, it is an object of the present invention to provide a wind turbine that adjusts the angle of attack top seek optimization of the rotation's energy of the wind turbine.

It is another object of the present invention to create a wind turbine with a perimeter allowing a generator to be positioned along the lower portion of the perimeter.

It is another object of the present invention to provide a wind turbine with auto-adjusting twist to seek optimization in response to wind direction and speed.

It is another object of the present invention to reduce or eliminate the need for complicated blade pitch control system and vanes on one embodiment.

SUMMARY OF THE INVENTION

The above objectives are accomplished according to the present invention by providing a wind turbine having a mast, hub, cables, and rim comprising: a plurality of airfoils carried by one or more cables and disposed between the hub and the rim; wherein each airfoil includes a leading edge and a trailing edge and is symmetrical along a bisect from the leading edge to the trailing edge; a vane attached to each airfoil having a shaft and fin so that the airfoil has an angle of attack in the range of 10° and 12°; wherein each airfoil has a slightly different angle of attack relative to the adjacent airfoil on the cable. In one embodiment, the camber line and the chord line are superimposed. The chord length can be in the range of 5 inches to 10 inches in one embodiment and about 7 inches in one embodiment.

The invention can include airfoils having a length along the direction of the cable of between 4 feet and 12 feet, in one embodiment. Sailets can be attached to the rim that can extend between 6 feet and 12 feet from the exterior of the rim wherein the sailets can be fixed pitch or variable pitch. Spacers can be included between each airfoil to prevent the airfoil from interfering with the adjacent airfoil. Each airfoil can include an end cap. A stop, such as a pin, can be included in each airfoil to prevent the airfoil from rotating a predetermined amount such as less than 90°. The airfoil can be made from high performance vinyl ester resin, 40% unidirectional fiberglass reinforcement, 17% continuous fiberglass mat, balance proprietary resin mixture, UV inhibitors, color of choice, and a surfacing protection veil.

The invention can include a wind turbine wheel having a hub, a rim and a cable extending between the hub and the rim; a set of airfoils rotatably carried by the cable and disposed between the hub and the rim; a cinch attached to the cable and disposed between adjacent airfoils; and, an upturned section included in at least one airfoil in the set of airfoils and disposed at a trailing edge of the airfoil wherein each airfoil has a different angle of attack relative to an adjacent airfoil. An inner cable can extend between a distal end of the hub and the rim; and, a set of inner airfoils can be carried by the inner cable. An outer cable can extend between a distal end of the hub and the rim; and, a set of outer airfoils can be carried by the outer cable.

The wind turbine can include a first airfoil adjacent to the hub having a first length; a second airfoil adjacent to the rim having a second length; wherein the first length is less than the second length. An intermediate airfoil can have a length between the first length and the second length. A spacer assembly can be disposed between adjacent airfoils. A resilient member can be included in the spacer assembly. A washer can be included in the spacer assembly. The airfoils in the set of airfoils can have a length in a range of 2 feet to 12 feet. The airfoils in the set of air foils can have a shortest airfoil having a length of about 2 feet with the remaining airfoils having lengths longer. A vane can be attached to at least one airfoil in the set of airfoils.

The airfoils can include material selected from the group consisting of high-performance vinyl ester resin, 40% unidirectional fiberglass reinforcement, 17% continuous fiberglass mat, resin mixture, UV inhibitors, pigments, surfacing coatings and any combination. The wind turbine can include a generator having a generator wheel configured to engage the rim and disposed below the rim.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Figure 1:
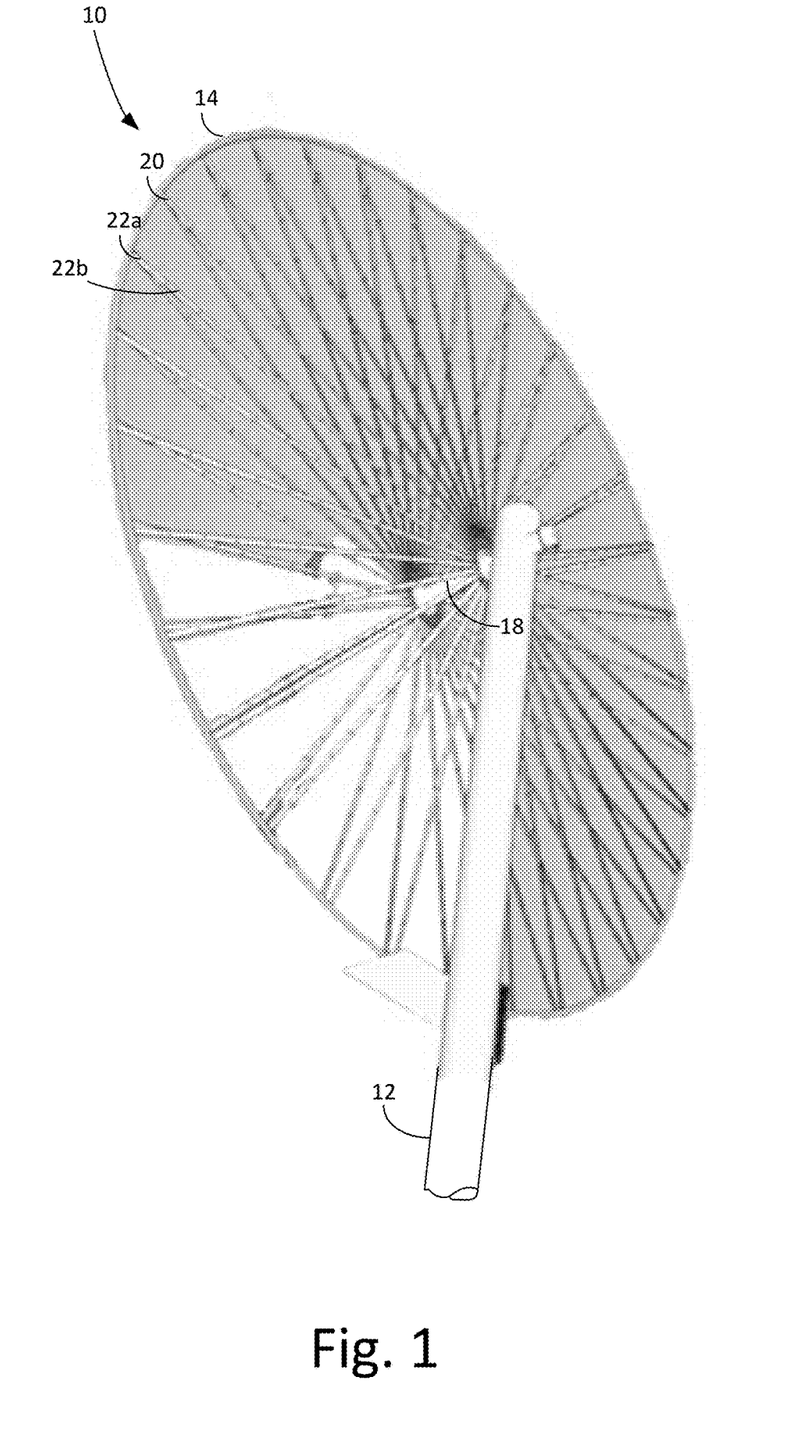
FIG. 1 is a rear perspective view of aspects of the invention.
Figure 2:
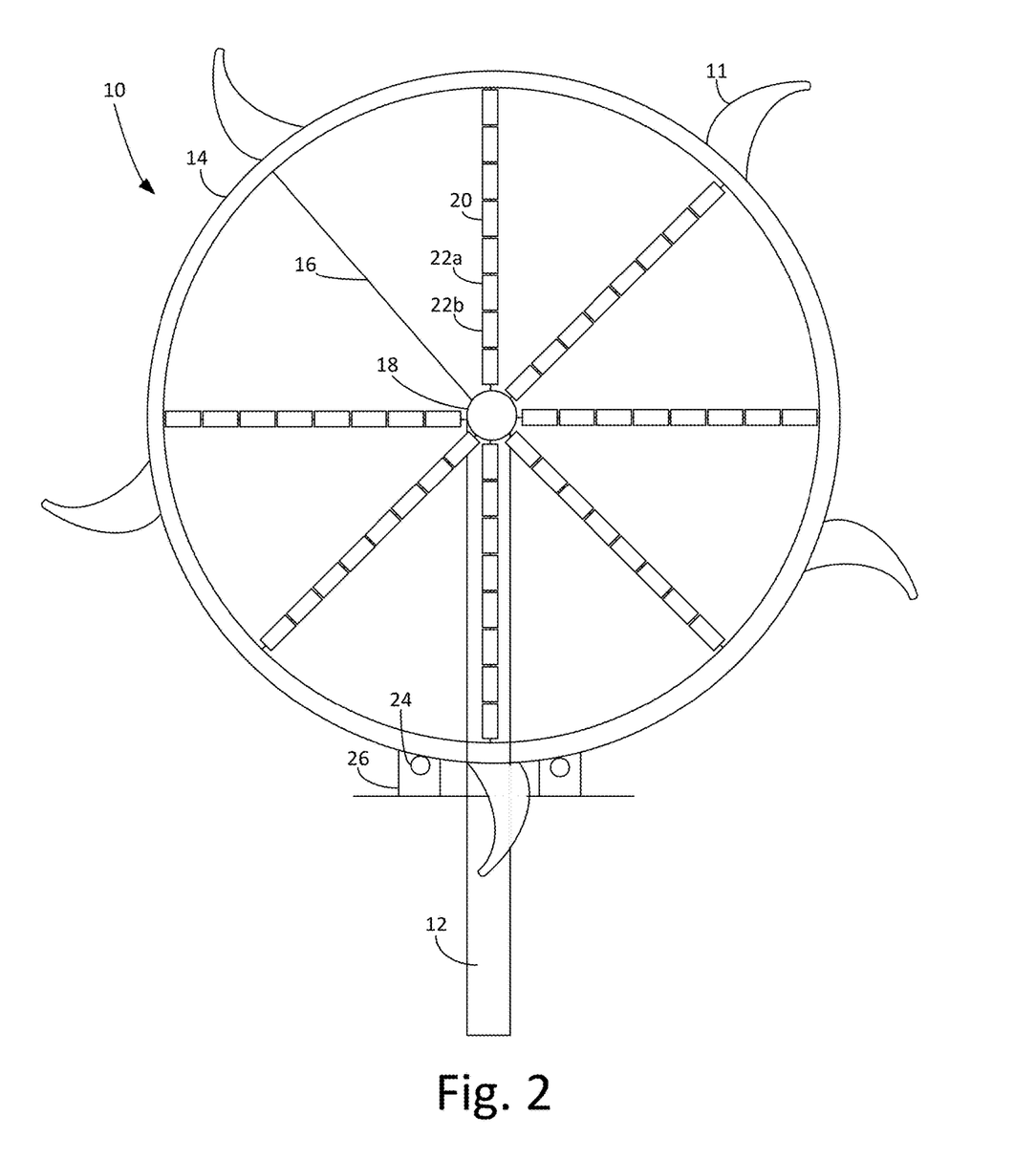
FIG. 2 is an elevated view of aspects of the invention.

Referring to FIGS. 1 and 2, a wind turbine 10 is shown having a mast 12. The wind turbine includes a rim 14 that has cables extending from the rim to a hub 18. A plurality of airfoils 20 can be carried by cables extending from the hub to the rim. In one embodiment, the wind turbine can include 80 cables that can be 80 feet or more in length and made from ¾ inch steel. A plurality of airfoils can include an opening that receives the cable and allows the airfoil to be slidable attached to and rotate about the cable. The opening can be circular, oval or other shape. Each airfoil on a cable can rotate independently of the other airfoils. For example, airfoil 22a can rotate about the cable independently of airfoil 22b. The airfoil can be of different lengths along a cable. For example, an airfoil disposed adjacent to the rim can have a shorter length that one disposed adjacent to the rim. When rotating, the airfoils are moving through the air at differing speed, due to the fact that the distance traveled for one airfoil is along a difference circumferential path. This travel distance can be represented by the travel distance=$2\pi r^2$ where r is the distance of the airfoil from the hub. Because each airfoil can rotate about the cable independently, the angle of attack of each airfoil can decrease from the hub to the rim. Further, the airfoil section can be longer at the rim than the hub as the angle of attack does not change as much the farther the distance from the hub (e.g. r). The angle of attack can stay relatively the same while the pitch of each airfoil can vary from hub to rim.

In operation, the rim can engage a generator wheel 24 of generator 26 so that rotational energy from the rim can be transferred to the generator wheel and therefore turn the generator to produce electricity.

Figure 3:
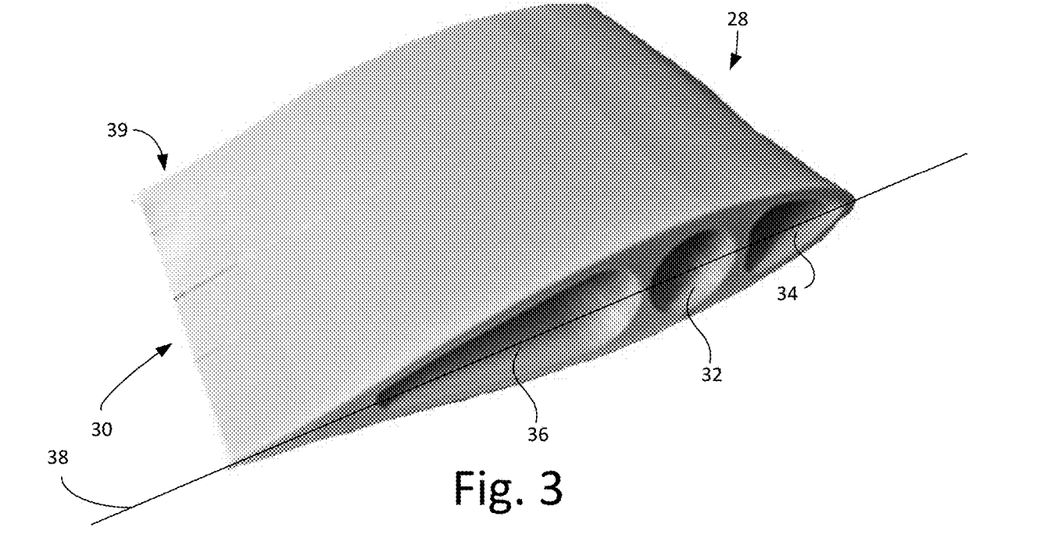
FIG. 3 is a perspective view of aspects of an airfoil.

Referring to FIG. 3, an example of a section of an airfoil 40 is shown. The airfoil can include a leading edge 28 and a trailing edge 30. A cable opening 32 can be included in the airfoil to receive the cable and allow the airfoil to rotate about the cable. A forward opening 34 can be included and have a generally pyramid cross section and reduce the weight of the airfoil. A rear opening 36 can be included having a tear drop cross section. In one embodiment, the airfoil is symmetrical along bisect 38. In one embodiment, the trailing edge of the airfoil can include an upturned section 39 that can increase the camber line resulting in a high lift coefficient producing more rotational speed for the wind turbine. With this upturned section, the angle of attack can be less for the same amount of rotational force created. In one embodiment, the upturned section can be in the range of 5 degrees to 15 degrees.

Figure 4:
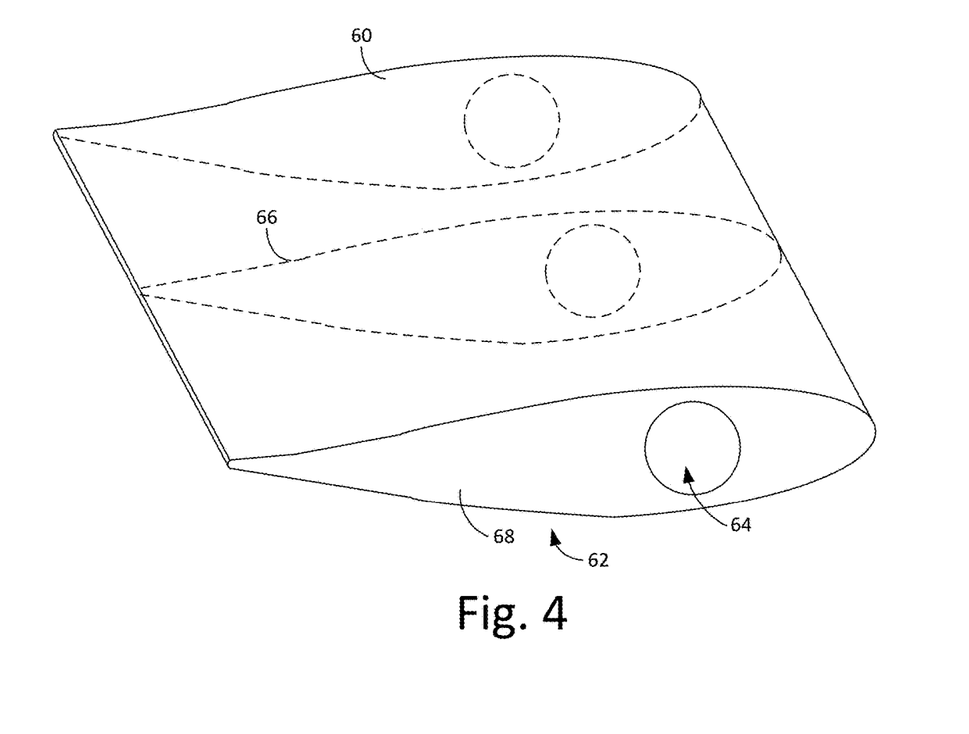
FIG. 4 is a perspective view of aspects of an airfoil.

Referring to FIG. 4, one embodiment of the airfoil can include an upper surface 60 and a lower surface 62 having a cable opening 64 disposed in a space defined between the upper and the lower surface. Support ribs 66 can be disposed between the upper and lower surface to provide support and maintain the shaped of the airfoil. The cable opening can extend through one or more ribs. The end of the airfoil can be closed with an end cap 68. The ribs can include rib openings.

Figure 5:
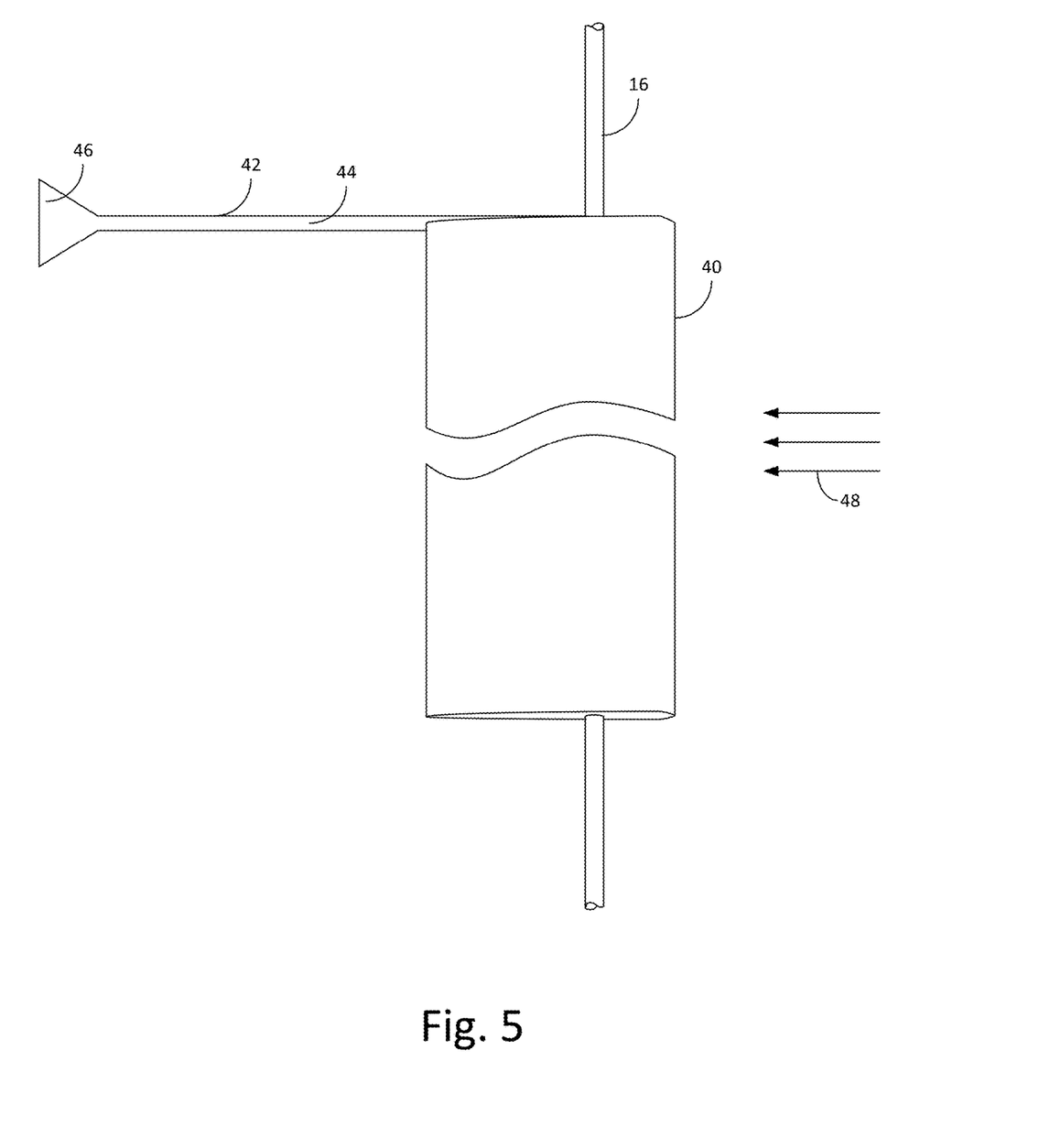
FIG. 5 is a side view of aspects of the invention.

Referring to FIG. 5, one embodiment of the airfoil 40 is shown carried by cable 16 so that the airfoil can rotate about the cable. A vane 42 can be attached to the airfoil extending toward the trailing edge and include a shaft 44 and fin 46. When the air flows in a direction shown as 48, the vane causes the leading edge to face the wind direction causing the airfoil to rotate toward the optimal angle of attack. As this configuration reacts to the relative wind direction, each airfoil along the cable may have a slightly different angle of attack providing an advantageous configuration of the plurality of airfoils along the cable. In one embodiment, the achieved angle of attack is in the range of 9 to 13 degrees. In one embodiment, the airfoil is in the range of 5 to 10 inches in width, 1 to 2 inches at its thickest portion and 8 to 12 feet in length. In one embodiment, the shaft is about 2 feet. The vane can be included in the end cap and on one or both ends of the airfoil.

Figure 6:
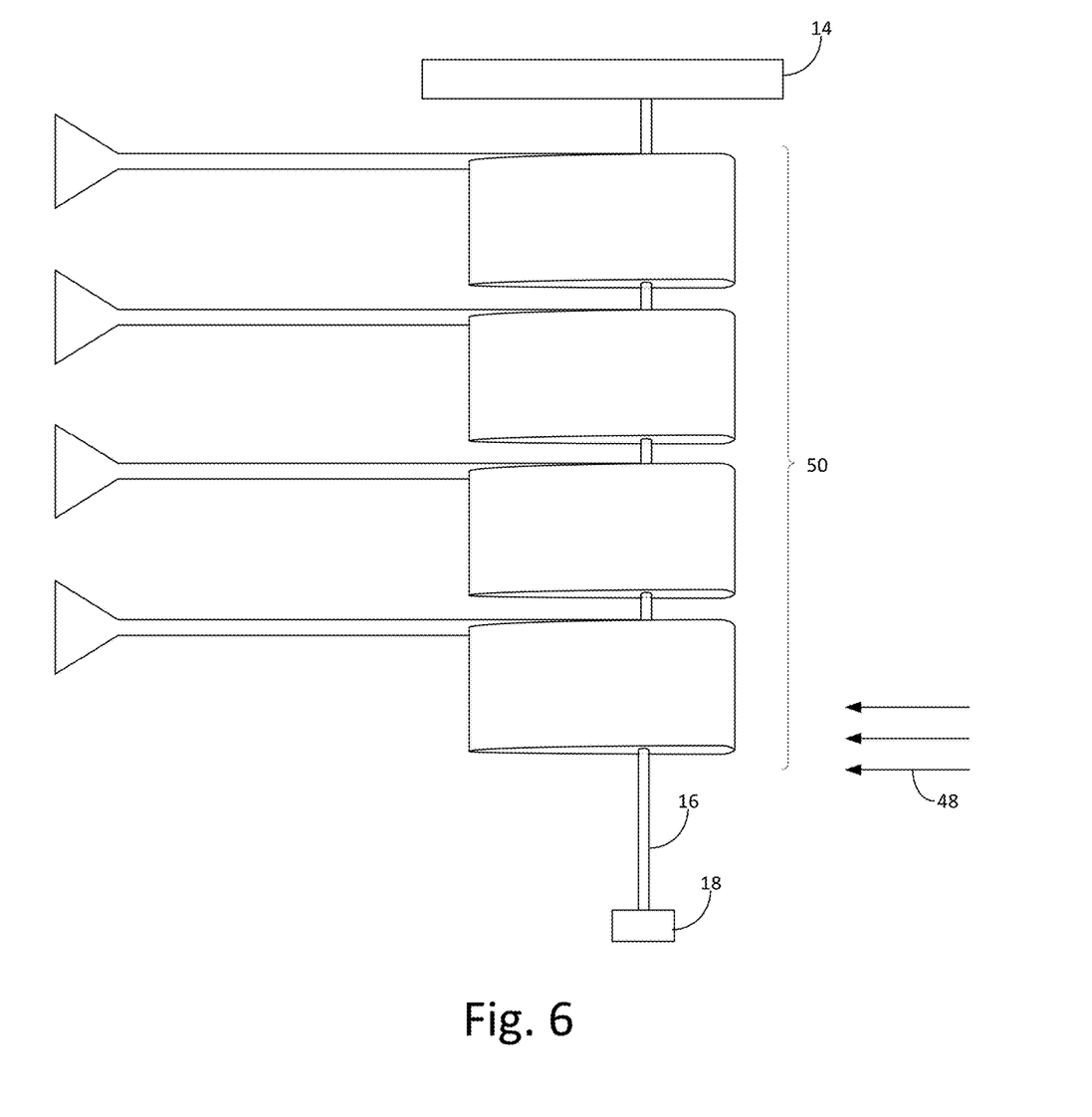
FIG. 6 is a side view of aspects of the invention.

Referring to FIG. 6, a plurality of airfoils are shown carried by cable 16 wherein each airfoil can independently rotate about the cable 16. The airfoil can include an opening 32 (FIG. 2) that received the cables and attached the airfoil to the wind turbine. Given that each airfoil can have a different angle of attack, the airfoil assembly 50 can act as a blade with a twist. As each airfoil can rotate independently of each other, the airfoil assembly can result in a twist resulting from the true wind speed, a twist that is not possible with the transitional single blade. Therefore, an airfoil can automatically adjust to changes in the relative positions of the wind when the cable opening 32 location is placed between the leading edge and trailing edge allowing the airfoil to automatically position itself at an optimum angle of attack regardless of true wind or apparent wind direction.

Figure 7A:
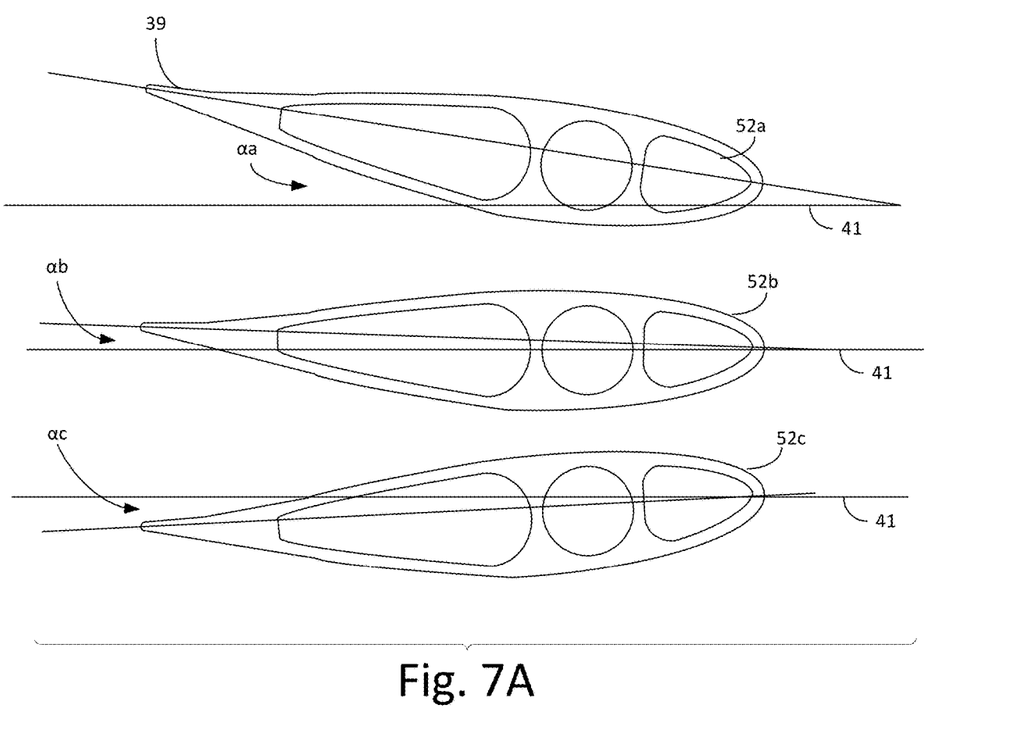
FIG. 7A is a cross section of aspects of the invention.
Figure 7B:
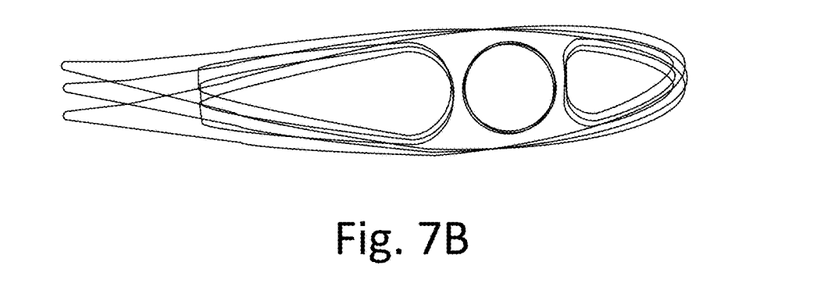
FIG. 7B is a cross section aspects of the invention.

Referring to FIG. 7A, several airfoils are shown with airfoil 52a being positioned above airfoil 52b which it in turn positioned over airfoil 52c. Given that the vanes position each airfoil with different angles of attack, we see that $\alpha_a \neq \alpha_b \neq \alpha_c$ so that the assembly creates a twist along the length of the cable. In one embodiment, $\alpha_a$, $\alpha_b$, and $\alpha_c$ can all be positive relative to horizontal line 41. FIG. 7B shows the plurality of the airfoils superimposed representing the airfoils rotating as they would be along the cable.

The invention can provide for automatic blade pitch control with no blade pitch drive system or software. The airfoil sections can automatically adjust to the optimum 80-foot blade twist. The automatic blade twist can also adjust itself for the true wind speed which current blades cannot do. Maintenance will be significantly less than what is required with the traditional designs. Completely changing an airfoil assembly will take significantly less time than current blade exchanges. Transportation of the wind turbine is simplified with a much more compact and simpler design than with the traditional blade systems. When parked, the airfoil assembly can accommodate higher wind than the traditional blade designs. When the wind turbine is parked, the airfoil assembly will provide no lift as the wind can automatically turns the wheel downwind from the mast since the airfoils can be configured so they can only rotate 90°. The vane can be fixed to the airfoil, so it always keeps airfoil at an ideal angle of attack eliminating a blade pitch drive. When the capacity of the generator is reached, and the wind speed increases the electric output can be limited by yawing out of perpendicular to the sailets.

Figure 8A:
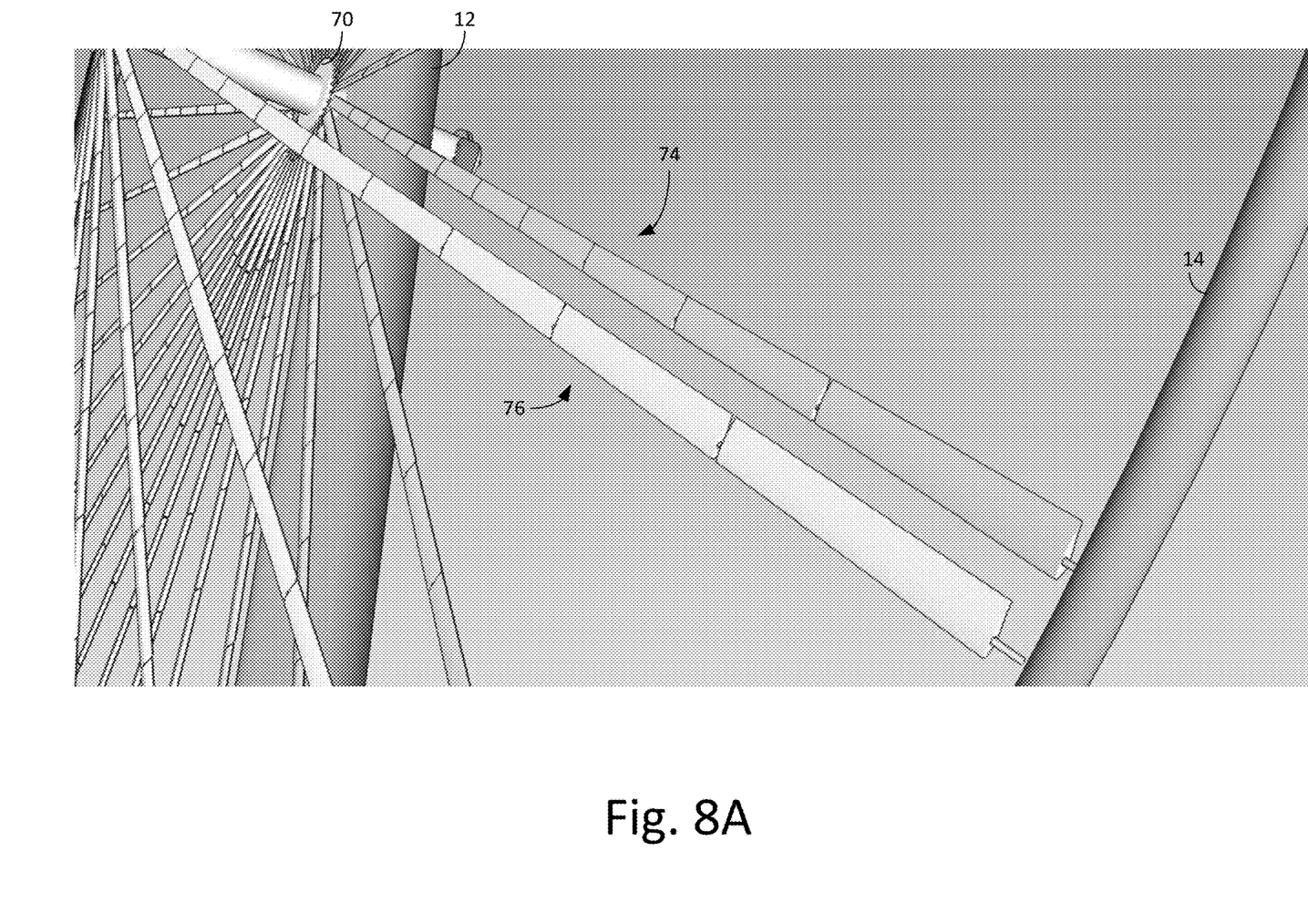
FIG. 8A is an upward perspective view of aspects of the invention.
Figure 8B:
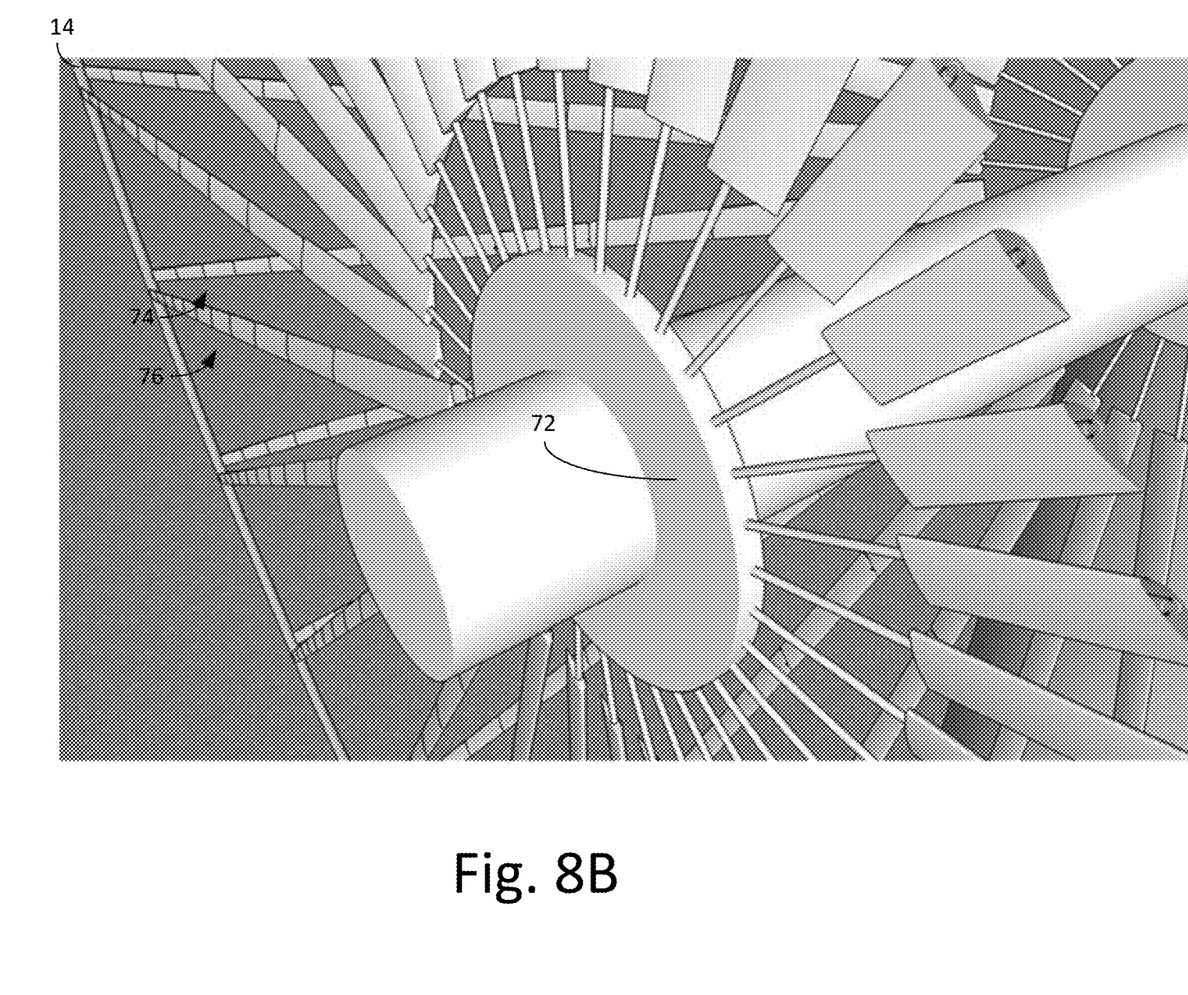
FIG. 8B is a downward perspective view of aspects of the invention.

Referring to FIGS. 8A and 8B, the mast 12 supporting the wind turbine support the hub. Cables extending between the hub and the rim 14 as shown carrying a plurality of airfoils. An inner set of cables can extend from the proximal end of the hub 70 to rim 14. An outer set of cables can extend from the distal end of the hub 72 to rim 14. A cable of the inner set of cables can include a set of inner airfoils 74 extending from the hub to the rim. An outer cable in the outer set of cables can include an outer set of airfoils 76 extending from the hub to the rim.

Figure 9:
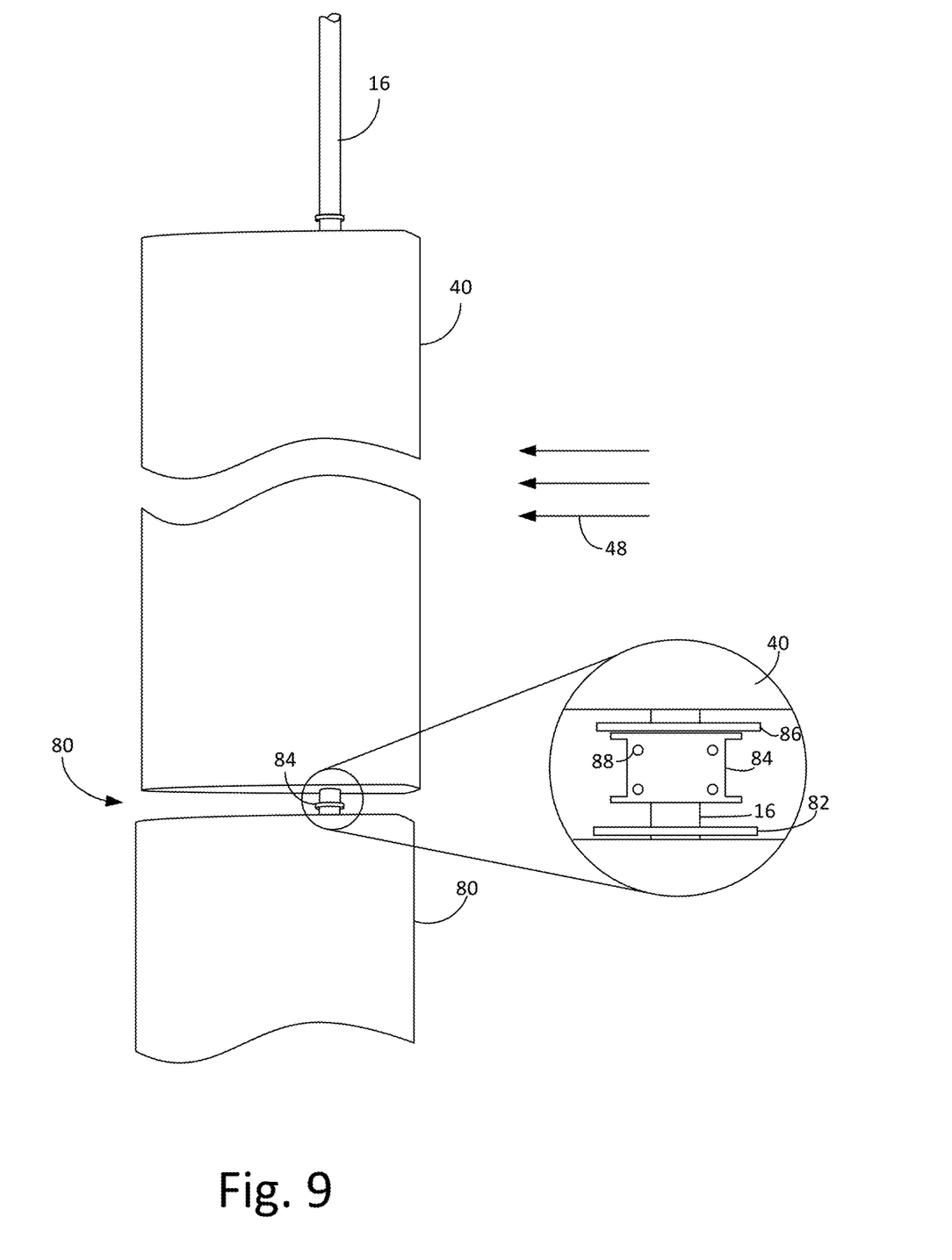
FIG. 9 is a side view of aspects of the invention.

Referring to FIG. 9, the airfoil 40 is shown rotatable carried by cable 16. An adjacent airfoil 80 is shown disposed closer to the hub with airfoil 40 disposed closer to the rim. When rotating, inertia forces due to the rotation of the turbine wheel force the airfoil toward the rim away from the hub. This force can cause adjacent airfoils to bind against each other and restrict the ability of the airfoil to rotate about the cable interfering with the airfoils ability to optimize the angle of attack. The airfoils can be separated from each other by gaps 82 that are created by a spacer assembly 84. The spacer assembly can be secured to the cable and prevents the airfoil inwardly adjacent to the spacer assembly from applying pressure to the outwardly adjacent airfoil. The spacer assembly can include an inward washer 82 that can include lubricity, high temperature tolerance, UV resistance, saltwater resistance and crush resistance. In one embodiment, the lower washer can be made from polytetrafluoroethylene (PTFE). A cinch 84 can be secured to a fixed position on the cable preventing the cinch from sliding along the cable. In one embodiment, the cinch can include two components that are placed on either side of the cable and secured together such as with screws that can extend through cinch openings 88. Therefore, when the lower adjacent airfoil 80 is force toward an upward adjacent airfoil, the cinch and washer prevent the lower adjacent airfoil from contacting the upper adjacent airfoil and therefore can prevent the airfoils from binding. The spacer assembly can include an upper washer 86 disposed between the cinch and the upper adjacent airfoil so that when the turbine wheel is at rest, the upper airfoil contacts the upper washer and not the cinch. In one embodiment, a resilient member such as a spring or other tensioned member can be disposed between the cinch and the lower washer or the lower airfoil.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An improved wind turbine comprising:
   a wind turbine wheel having a hub, a rim and a cable extending between the hub and the rim;
   a set of airfoils carried by the cable and disposed between the hub and the rim; and,
   an upturned section included in at least one airfoil in the set of airfoils defined by an upward slope of a surface contour along a top side disposed at a trailing edge of the airfoil relative to a horizontal plane extending from a leading edge to the trailing edge, and wherein each airfoil has a different angle of attack relative to an adjacent airfoil.

2. The improved wind turbine of claim 1 wherein a first airfoil is configured to rotate about the cable.

3. The improved wind turbine of claim 2 including a fin disposed at a distal end of a shaft carried by a first airfoil, wherein the fin causes rotation of the airfoil to an optimal angle of attack relative to a wind direction.

4. The improved wind turbine of claim 1 including:
   an inner cable extending between a proximal end of the hub and the rim; and,
   a set of inner airfoils carried by the inner cable.

5. The improved wind turbine of claim 4 including:
   an outer cable extending between a distal end of the hub and the rim; and,
   a set of outer airfoils carried by the outer cable.

6. The improved wind turbine of claim 1 including:
   a first airfoil adjacent to the hub having a first length;
   a second airfoil adjacent to the rim having a second length; and,
   wherein the first length is less than the second length.

7. The improved wind turbine of claim 6 including an intermediate airfoil having a length between the first length and the second length.

8. The improved wind turbine of claim 1 including a cinch disposed between adjacent airfoils.

9. The improved wind turbine of claim 1 including a spacer assembly disposed between adjacent airfoils.

10. The improved wind turbine of claim 9 including a resilient member included in the spacer assembly.

11. The improved wind turbine of claim 1 wherein an airfoil in the set of airfoils has a length in a range of 2 feet to 12 feet.

12. The improved wind turbine of claim 1 the airfoil in the set of airfoils includes material selected from the group consisting of a high-performance vinyl ester resin, 40% unidirectional fiberglass reinforcement, 17% continuous fiberglass mat, resin mixture, UV inhibitors, pigments, surfacing coatings and combinations thereof.

13. The improved wind turbine of claim 1 including a cable opening defined in each airfoil in the set of airfoils for receiving the cable.

14. The improved wind turbine of claim 1 including a generator having a generator wheel configured to engage the rim and disposed below the rim.

15. An improved wind turbine comprising:
   a rim;
   a set of cables extending between a distal end of a hub and the rim;
   a set of airfoils rotatably attached to the set of cables; and,
   an upturned section included in at least one airfoil in the set of airfoils defined by an upward slope of a surface contour along a top side disposed at a trailing edge of the airfoil relative to a horizontal plane extending from a leading edge to the trailing edge.

16. The improved wind turbine of claim 15 including a spacer assembly disposed between adjacent airfoils.

17. The improved wind turbine of claim 16 including a cinch included in the spacer assembly.

18. An improved wind turbine comprising:
   a wind turbine wheel having a rim and a hub;
   a set of airfoils independently and rotatably extending between the rim and the hub; and,
   an upturned section included in at least one airfoil in the set of airfoils defined by an upward slope of a surface contour along a top side disposed at a trailing edge of the airfoil relative to a horizontal plane extending from a leading edge to the trailing edge.

19. The improved wind turbine of claim 18 including a generator having a generator wheel configured to engage an outer perimeter of the rim.

20. The improved wind turbine of claim 19 including a mast configured to support the hub and said generator.

* * * * *